(12) United States Patent
Wright et al.

(10) Patent No.: US 10,096,166 B2
(45) Date of Patent: Oct. 9, 2018

(54) APPARATUS AND METHOD FOR SELECTIVELY DISPLAYING AN OPERATIONAL ENVIRONMENT

(71) Applicant: BAE Systems plc, London (GB)

(72) Inventors: Julian David Wright, Preston (GB); Nicholas Giacomo Robert Colosimo, Preston (GB); Christopher James Whiteford, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/527,988

(22) PCT Filed: Nov. 10, 2015

(86) PCT No.: PCT/GB2015/053398
§ 371 (c)(1),
(2) Date: May 18, 2017

(87) PCT Pub. No.: WO2016/079474
PCT Pub. Date: May 26, 2016

(65) Prior Publication Data
US 2017/0330381 A1    Nov. 16, 2017

(30) Foreign Application Priority Data
Nov. 19, 2014 (GB) ..................... 1420571

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC .... B64D 2011/0061; G02B 2027/0138; G02B 27/017; G06F 3/017; G06F 3/011; G06T 19/006
See application file for complete search history.

(56) References Cited

U.S. PATENT DOCUMENTS 5,423,554 A    6/1995  Davis
6,108,031 A    8/2000  King et al.
(Continued)

FOREIGN PATENT DOCUMENTS

EP    0911647 A2    4/1999
EP    2189200 A1    5/2010
(Continued)

OTHER PUBLICATIONS

Kolsch et al., Touching the Visualized Invisible: Wearable AR with a Multimodal Interface, Dec. 2006, p. 1-24.*
(Continued)

*Primary Examiner* — Robert Craddock
(74) *Attorney, Agent, or Firm* — Maine Cernota & Rardin

(57) ABSTRACT

Apparatus for selectively displaying an operational area comprising an internal and an external environment separated from another by at least one physical obstruction, the apparatus comprising a headset including a screen for placing over a user's eyes, the system further comprising a processor configured to generate a three-dimensional virtual environment, and an image capture device for capturing images of the internal environment, said processor being configured to blend image data representative thereof into said three dimensional virtual environment to create a mixed reality environment including a representation of said at least one physical obstruction, the processor configured to receive image data representative of said external environment and to remove at least a portion of said physical obstruction from said mixed reality environment displayed (Continued)

on said screen, and blend said image data of said external environment into said mixed reality environment wherein said physical obstruction appears to be transparent.

12 Claims, 2 Drawing Sheets

(51) Int. Cl.
*G06F 3/01* (2006.01)
*G02B 27/01* (2006.01)
*B64D 11/00* (2006.01)

(52) U.S. Cl.
CPC ...... *G06F 3/017* (2013.01); *B64D 2011/0061* (2013.01); *G02B 2027/0138* (2013.01)

(56) References Cited

U.S. PATENT DOCUMENTS

| | | | |
|---|---|---|---|
| 6,215,498 | B1 | 4/2001 | Filo et al. |
| 7,180,476 | B1 | 2/2007 | Guell et al. |
| 8,179,604 | B1 | 5/2012 | Prada Gomez et al. |
| 9,380,270 | B1 | 6/2016 | Worley, III |
| 2002/0080094 | A1 | 6/2002 | Biocca et al. |
| 2004/0193413 | A1 | 9/2004 | Wilson |
| 2005/0195128 | A1 | 9/2005 | Volo |
| 2006/0050070 | A1 | 3/2006 | Canon |
| 2007/0035561 | A1 | 2/2007 | Batchelder |
| 2007/0247457 | A1 | 10/2007 | Gustafsson et al. |
| 2011/0157016 | A1 | 6/2011 | Chang |
| 2011/0213664 | A1 | 9/2011 | Osterhout |
| 2012/0115598 | A1* | 5/2012 | Hagstrom .............. G06T 19/006 463/31 |
| 2012/0124516 | A1 | 5/2012 | Friedman |
| 2012/0188155 | A1 | 7/2012 | Eun |
| 2012/0249416 | A1 | 10/2012 | Maciocci et al. |
| 2012/0262558 | A1 | 10/2012 | Boger |
| 2013/0044912 | A1 | 2/2013 | Kulkarni |
| 2013/0050069 | A1 | 2/2013 | Ota |
| 2013/0249947 | A1* | 9/2013 | Reitan ..................... G06F 3/011 345/633 |
| 2013/0257899 | A1 | 10/2013 | Baron |
| 2014/0160165 | A1 | 6/2014 | Kim et al. |
| 2014/0180508 | A1 | 6/2014 | Zaneboni et al. |
| 2015/0092020 | A1 | 4/2015 | Vaughn |
| 2015/0161762 | A1* | 6/2015 | Fujiwara ................. G06T 11/60 345/633 |

FOREIGN PATENT DOCUMENTS

| | | |
|---|---|---|
| EP | 2267588 A2 | 12/2010 |
| EP | 2456203 A1 | 5/2012 |
| EP | 2693255 A1 | 2/2014 |
| GB | 2376397 A | 12/2002 |
| WO | 0161672 A1 | 8/2001 |
| WO | 2011081283 A1 | 7/2011 |

OTHER PUBLICATIONS

International Preliminary Report on Patentability of International Application No. PCT/GB2016/050453, dated Aug. 29, 2017, 8 pages.
International Preliminary Report on Patentability of International Application No. PCT/GB2016/050454, dated Aug. 29, 2017, 9 pages.
International Preliminary Report on Patentability of PCT Application No. PCT/GB2015/053413, dated May 23, 2017, 10 pages.
International Preliminary Report on Patentability of PCT Application No. PCT/GB2015/053394, dated May 23, 2017, 9 pages.
International Preliminary Report on Patentability of PCT Application No. PCT/GB2015/053398, dated May 23, 2017, 10 pages.
Search Report of Great Britain Patent Application No. GB1420572.8, dated May 18, 2015, 4 pages.
International Search Report and Written Opinion of PCT Application No. PCT/GB2015/053394, dated Jan. 19, 2016, 12 pages.
Search Report of Great Britain Application No. GB1420570.2, dated May 15, 2015, 3 pages.
International Search Report and Written Opinion of PCT Application No. PCT/GB2015/053413, dated Jan. 8, 2016, 16 pages.
Huagen Wan et al: "MRStudio: A mixed reality display system for aircraft cockpit", VR Innovation (ISVRI), 2011 IEEE International Symposium on, IEEE, Mar. 19, 2011, pp. 129-135, XP031861038.
Search Report of Great Britain Application No. GB1420571.0, dated May 20, 2015, 4 pages.
International Search Report and Written Opinion of PCT Application No. PCT/GB2015/053398, dated Jan. 11, 2015, 16 pages.
Anonymous: "Head-mounted display", Oct. 24, 2014, pp. 1-8, XP055239689, Retrieved from the internet: URL: htpps://en.wikipedia.org/w/index.php?title=Head-mounted_display&oldid=630982880.
International Search Report and Written Opinion of International Application No. PCT/GB2016/050453, dated Apr. 1, 2016, 13 pages.
Hongbin Gu et al: "Development of a Novel Low-Cost Flight Simulator for Pilot Training", National Journal of Mechanical, Aerospace, Industrial, Mechatronic and Manufacturing Engineering vol. 3, Np:12, 2009, Dec. 31, 2009, pp. 1-5, XP055242896.
European Search Report of European Application No. EP15182891, dated Jan. 21, 2016, 8 pages.
Search Report under Section 17(5) of Great Britain application No. GB1503115.6, dated Aug. 25, 2015, 3 pages.

* cited by examiner

Cameras mounted
on or integrated into
external surface

APPARATUS AND METHOD FOR SELECTIVELY DISPLAYING AN OPERATIONAL ENVIRONMENT

RELATED APPLICATIONS

This application is a National Phase application filed under 35 USC § 371 of PCT Application No. PCT/GB2015/053398 with an International filing date of Nov. 10, 2015 which claims priority of GB Patent Application 1420571.0 filed Nov. 19, 2014. Each of these applications is herein incorporated by reference in their entirety for all purposes.

This invention relates generally to an apparatus and method for selectively displaying an operational environment to a user and, more particularly but not necessarily exclusively, to an apparatus and method for selectively displaying the internal and external environments of a vehicle, such as the cockpit and external airspace of an aircraft, to a driver, e.g. the pilot, or a passenger of said vehicle.

It is known, particularly in the field of military fighter aircraft and the like, to provide a helmet-mounted display, wherein a helmet having a transparent visor is provided with an internal, transparent screen, such that the wearer can view their real world environment, whilst also viewing additional images and/or data in a virtual reality format on the screen. Thus, a processor is provided that receives data from multiple sources, such as external image capture devices, speed sensors, weapon sensors, or target tracking systems, and generates images representative of said data which are projected onto the screen, thus effectively being superimposed on the wearer's real world field of view through the visor/screen assembly.

In one known such arrangement, a night vision camera is provided on the helmet, and images captured thereby are projected onto the screen (thereby being "superimposed" on the wearer's real world field of view), together with other critical information such as speed, weapons and target.

Aspects of the present invention seek to provide an alternative head mounted display apparatus and method which, in accordance with some embodiments may be more generally applicable to operators of other vehicle types and in a wide variety of applications.

Thus, in accordance with an aspect of the present invention, there is provided apparatus for selectively displaying an operational area to a user, said operational area comprising an internal environment and an external environment, wherein said external environment is separated from said internal environment by at least one physical obstruction, the apparatus comprising a headset for placing over a user's eyes, in use, the headset including a screen, the system further comprising a processor configured to generate a three-dimensional virtual environment, and an image capture device for capturing images of the real world environment within said internal environment, said processor being configured to blend image data representative thereof into said three dimensional virtual environment to create a mixed reality environment, including a representation of said at least one physical obstruction, and display said mixed reality environment on said screen, the processor including an input for receiving image data representative of images captured by an image capture device having its field of view covering a section of said external environment, the processor being further configured to remove at least a portion of said at least one obstruction from said mixed reality environment displayed on said screen, and blend said image data representative of a corresponding portion of said external environment beyond said obstruction into said mixed reality environment wherein said physical obstruction appears to be transparent or translucent relative to said external environment.

The apparatus may be configured to allow a user, in use, to select said at least a portion of said physical obstruction to be removed from said mixed reality environment, optionally by means of one or more hand gestures.

In one exemplary embodiment, such one or more hand gestures may comprise predefined hand gestures associated with specific control commands. In this case, the processor may be configured to identify a user hand gesture and its location within said captured images, determine therefrom the control command with which it is associated, and generate said control command.

In another exemplary embodiment, the apparatus may comprise a physical control panel including one or more physical control devices which are manually actuatable by a user, wherein said processor is configured to identify, within said captured images, user hand gestures indicative of actuation of said one or more physical control devices and generate a respective control signal for removing a selected portion of said physical obstruction from said mixed reality environment.

The apparatus may comprise a pair of spatially separated image capture devices for capturing respective images of the real world environment in the user's field of view, said processor being configured to define a depth map using respective image frame pairs to produce three dimensional image data. In this case, the image capture devices may be mounted on said headset, optionally so as to be substantially aligned with a user's eyes, in use.

The three dimensional virtual environment may be identified in said processor as a first image layer, said image data representative of said internal environment may be identified in said processor as a second image layer, and said image data representative of said external environment, beyond said physical obstruction, may be identified in said processor as a third image layer, wherein, in respect of a selected portion of said physical obstruction, the processor may be configured to: remove from the mixed reality environment a corresponding portion of said second image layer including image data representative of said physical obstruction, and blend image data from a corresponding portion, relative to the user's field of view, of said third image layer into said mixed reality environment.

In one exemplary embodiment, the processor may be configured to generate information symbols or messages in relation to said external environment, and selectively superimpose image data representative thereof onto said third image layer.

Another aspect of the present invention extends to a method for selectively displaying an operational area to a user, said operational area comprising an internal environment and an external environment, wherein said external environment is separated from said internal environment by at least one physical obstruction, the method comprising providing apparatus as described above, and configuring the processor to generate a three-dimensional virtual environment, receive, from the image capture device, images of the real world environment within said internal environment, blend image data representative thereof into said three dimensional virtual environment to create a mixed reality environment, including a representation of said at least one physical obstruction, and display said mixed reality environment on said screen, receive an input representative of a selected portion of said physical obstruction, remove said selected portion of said at least one obstruction from said mixed reality environment displayed on said screen, and blend said image data representative of a corresponding portion of said external environment beyond said obstruction into said mixed reality environment wherein said physical obstruction appears to be transparent or translucent relative to said external environment.

In one exemplary embodiment, the internal environment may comprise an aircraft cockpit, and said physical obstruction may comprise one or more of a control panel, an aircraft side wall and an aircraft floor, the method then including the step of providing at least one image capture device in or on the external wall of the aircraft for capturing images representative of said external environment.

These and other aspects of the invention will be apparent from the following specific description in which embodiments of the invention are described, by way of examples only, and with reference to the accompanying drawings, in which.

Figure 1:
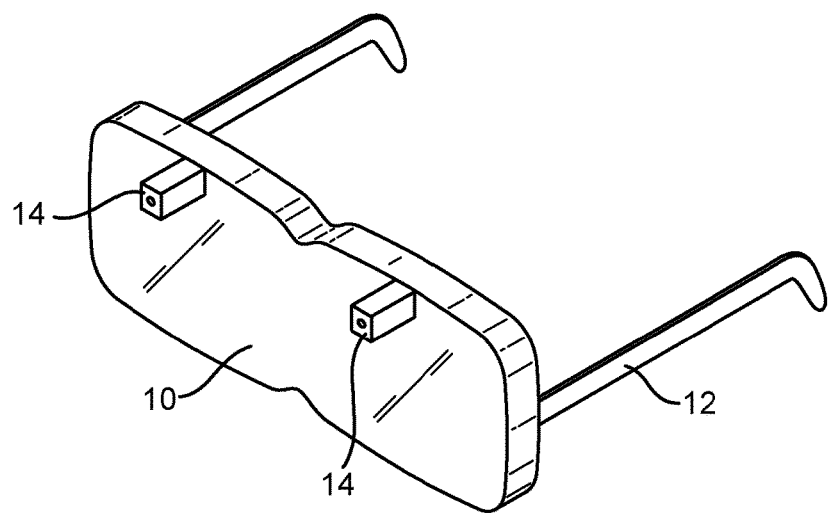
FIG. 1 is a front perspective view of a headset for use in a control system according to an exemplary embodiment of the present invention.

Referring to FIG. 1 of the drawings, a system according to an exemplary embodiment of the present invention may comprise a headset comprising a visor 10 having a pair of arms 12 hingedly attached at opposing sides thereof in order to allow the visor to be secured onto a user's head, over their eyes, in use, by placing the curved ends of the arms 12 over and behind the user's ears, in a manner similar to conventional spectacles. It will be appreciated that, whilst the headset is illustrated herein in the form of a visor, it may alternatively comprise a helmet for placing over a user's head, or even a pair of contact lenses or the like, for placing within a user's eyes, and the present invention is not intended to be in any way limited in this regard. Also provided on the headset, is a pair of image capture devices 14 for capturing images of the environment, such image capture devices being mounted as closely as possible aligned with the user's eyes, in use.

The system of the present invention further comprises a processor, which is communicably connected in some way to a screen which is provided inside the visor 10. Such communicable connection may be a hard wired electrical connection, in which case the processor and associated circuitry will also be mounted on the headset. However, in an alternative exemplary embodiment, the processor may be configured to wirelessly communicate with the visor, for example, by means of Bluetooth or similar wireless communication protocol, in which case, the processor need not be mounted on the headset but can instead be located remotely from the headset, with the relative allowable distance between them being dictated and limited only by the wireless communication protocol being employed. For example, the processor could be mounted on, or formed integrally with, the user's clothing, or instead located remotely from the user, either as a stand-alone unit or as an integral part of a larger control unit, for example.

Figure 2:
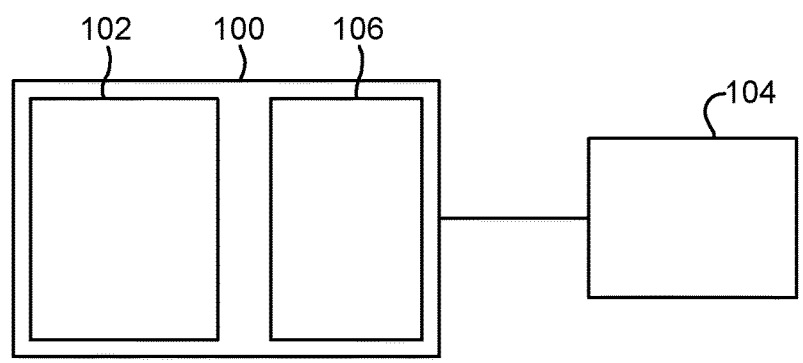
FIG. 2 is a schematic block diagram of a control system according to an exemplary embodiment of the present invention.

Referring to FIG. 2 of the drawings, a system according to an exemplary embodiment of the invention comprises, generally, a headset 100, incorporating a screen 102, a processor 104, and a pair of external digital image capture devices (only one shown) 106.

Figure 3:
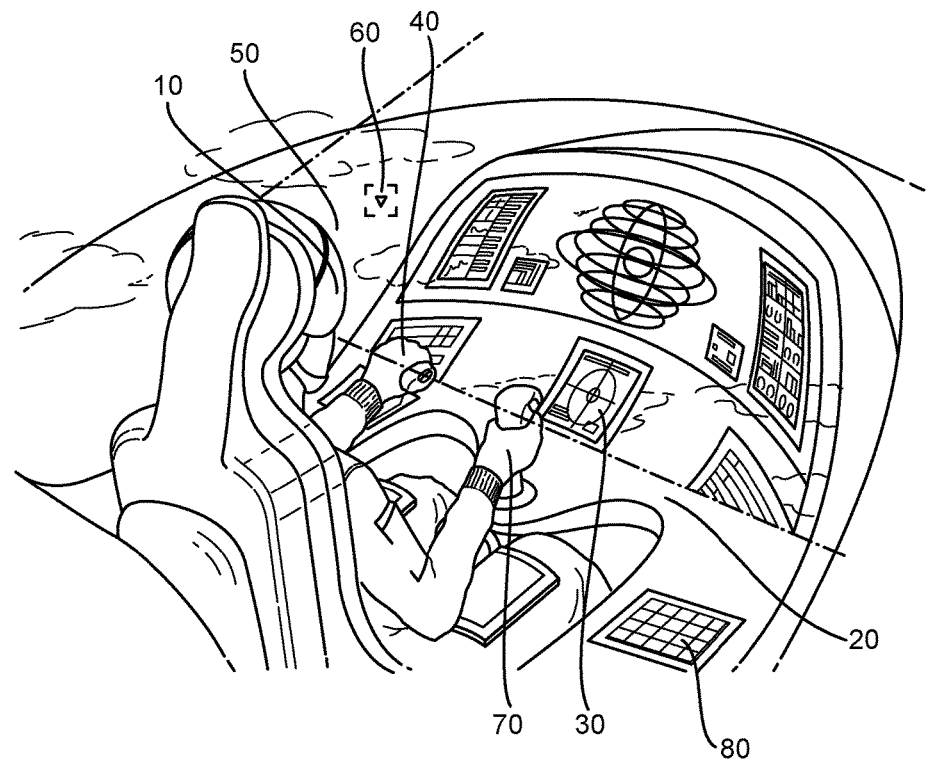
FIG. 3 is a schematic view of a mixed reality environment created by a system according to an exemplary embodiment of the present invention.

Referring additionally to FIG. 3 of the drawings, the processor 104 generates and displays on the screen within the headset 10, a three dimensional virtual environment. The content and format of the three dimensional virtual environment is not limited in respect of the present invention, and it may be configured as required according to the application in which the system is to be used and/or designer/user preference. Thus, for example, in its simplest form, the virtual environment may just comprise a "space" into which image data captured in respect of real world objects 20, 70, 80 is rendered and blended. However, in other exemplary embodiments, the three dimensional virtual space may include interactive virtual controls and/or representations 30 of one or more data sources, thereby providing the user with visual monitoring and control functionality within the three dimensional virtual environment. In this case, the processor 104 receives data from multiple sources in and on the vehicle in relation to parameters and characteristics to which the virtual displays/controls relate, and updates representations thereof, in real time, in accordance with the data thus received.

Digital video image frames of the user's real world environment, for example an aircraft cockpit, are captured by the image capture devices provided on the headset 10, and two image capture devices are used in this exemplary embodiment of the invention to capture respective images such that data representative thereof can be blended to produce a stereoscopic depth map which enables the processor to determine depth within the captured images without any additional infrastructure being required.

The vehicle's external environment 50, as well as the internal environment (including the floor and walls), are rendered from the captured images and blended into the three dimensional virtual environment displayed on the screen to create a complete, mixed reality vehicle operating environment. In this exemplary embodiment, the user is additionally provided with expected visual cues, such as their own body 40, within the three dimensional virtual environment, again by rendering and blending image data representative thereof, from the captured images, into the virtual environment displayed on the screen.

The concept of real time image blending for augmented reality is known, and several different techniques have been proposed. The present invention is not necessarily intended to be in any way limited in this regard. However, for completeness, one exemplary method for image blending will be briefly described. Thus, in respect of an object or portion of a real world image to be blended into the virtual environment, a threshold function may be applied in order to extract that object from the background image. Its relative location and orientation may also be extracted and preserved by means of marker data. Next, the image and marker data is converted to a binary image, possibly by means of adaptive thresholding (although other methods are known). The marker data and binary image are then transformed into a set of coordinates which match the location within the virtual environment in which they will be blended. Such blending is usually performed using black and white image data. Thus, if necessary, colour data sampled from the source image can be backward warped, using homography, to each pixel in the resultant virtual scene. All of these computational steps require minimal processing and time and can, therefore, be performed quickly and in real (or near real) time. Thus, as the vehicle moves and the external scenery changes and the vehicle status changes, for example, image data within the mixed reality environment can be updated in real time.

The concept of removing a selected portion or object from an image is equally possible, and can be effected by (essentially) performing the above-described process in reverse. Thus, the user can select a portion of the mixed reality image displayed on the screen, and cause it to be removed therefrom, as required.

Figure 4:
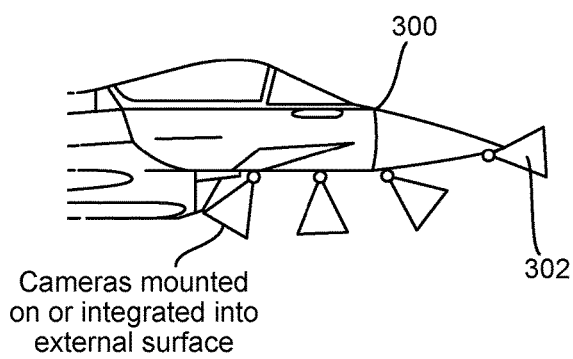
FIG. 4 is a schematic partial diagram of an aircraft having a plurality of external image capture devices mounted thereon for use in a system according to an exemplary embodiment of the present invention.

Referring additionally to FIG. 4 of the drawings, the vehicle 300 in which this embodiment of the present invention is deployed, is provided with a plurality of external image capture devices 302, mounted in or on the vehicle skin. Clearly, these image capture devices capture images in respect of the vehicle's external environment beyond the confines of the internal control environment. The processor 104 is configured to receive image and location data from the external image capture devices 302. In the event that an user selects a portion (e.g. a wall or the floor) of the physical control environment to be removed from the mixed reality environment displayed on the screen, the processor is configured to render and blend image data from the external environment immediately beyond the removed portion into the mixed reality environment displayed on the screen, thereby giving the impression that the wall or floor of the control environment is transparent and the user can "see through" it.

Interaction with any virtual control elements within the three dimensional virtual environment and/or selection of real world objects or portions to be removed from, or otherwise manipulated within, the mixed reality environment displayed on the screen, can be effected by, for example, hand gestures made by the user.

Several different techniques for automated recognition of hand gestures are known, and the present invention is not in any way intended to be limited in this regard. For example, predefined hand gestures may be provided that are associated with specific actions, in which case, the processor is preconfigured to recognise those specific predefined hand gestures (and/or hand gestures made at a particular location 'relative' to the interactive virtual controls) and cause the associated action to be performed in respect of a selected object, control, application or data item. Alternatively, a passive control panel or keyboard may be provided that appears to "operate" like a normal control panel or keyboard, except the user's actions in respect thereof are captured by the image capture devices, and the processor is configured to employ image recognition techniques to determine which keys, control elements or icons the user has pressed, or otherwise interacted with, on the control panel or keyboard, and cause the required action to be performed in respect of the selected object, control, application or data item. In yet another exemplary embodiment of the invention, the three-dimensional virtual environment may include images of conventional control elements, such as buttons, switches or dials, for example, with which the user can interact in and apparently conventional manner by means of appropriate hand gestures and actions captured by the image capture devices, and the processor is configured to recognise such hand gestures/actions and generate the appropriate control signals accordingly.

In any event, it will be appreciated that the image capture devices provided in the system described above can be used to capture video images of the user's hands (which can be selected to be blended into the 3D virtual environment displayed on the user's screen). Thus, one relatively simple method of automated hand gesture recognition and control using captured digital video images involves the use of a database of images of predefined hand gestures and the command to which they relate, or indeed, a database of images of predefined hand locations (in relation to the keyboard, control panel or virtual switches/buttons/dials) and/or predefined hand configurations, and the action or control element to which they relate. Thus, an auto threshold function is first performed on the image to extract the hand from the background. The wrist is then removed from the hand shape, using a so-called "blob" image superposed over the palm of the hand, to separate out the individual parts of the hand so that the edge of the blob defines the border of the image. The parts outside of the border (i.e. the wrist) are then removed from the image, following which shape recognition software can be used to extract and match the shape of a hand to a predefined hand gesture, or "markers associated with the configuration of the control panel or keyboard, or even physical location and/or orientation sensors such as accelerometers and the like, can be used to determine the relative position and hand action, and call the associated command accordingly.

It will be appreciated that a system according to the present invention can be used to provide an environment within which "blind spots" can be selectively eliminated by the use of external image capture devices and mixed reality image processing techniques. In effect, the invention operates in terms of image "layers", having a virtual layer and a real layer depicting the virtual reality and real world features within the same, mixed reality environment. Video feeds from the external image capture devices can be warped and stitched into the mixed reality image, so as to be properly scaled and aligned with the position and perspective of the user's view point in respect of a removed portion, wherein the system effectively treats the external camera feeds as a third "layer". The user can, in one embodiment, simply point to or select a control panel, wall, floor or component they wish to see through, and the selected area is then replaced by the layer representing the external view.

Symbology 60, such as markers tracks or runway outlines for example, can be superimposed onto the external layer.

It is also possible to use external cameras which exceed the human visual waveband and resolution, this allowing the user to not only see through the vehicle structure, but also to see in previously invisible wavelengths (such as those associated with heat), both through the structure or instead of the canopy view provided by the cameras on the system headset. This could be performed by the user selecting a specific waveband or choosing to offset a certain waveband using visible colours from their head mounted display.

It will be appreciated by a person skilled in the art, from the foregoing description, that modifications and variations can be made to the described embodiments without departing from the scope of the invention as claimed.

The invention claimed is:

1. A system for selectively displaying an operational area, in a real world environment, to a user, said operational area comprising:

an internal environment and an external environment, wherein said external environment is separated from said internal environment by at least one physical obstruction, the system comprising:
a headset for placing over a user's eyes, in use, the headset including a screen, the system further comprising:
a processor configured to generate a three-dimensional virtual environment; and an image capture device for capturing images of the real world environment within said internal environment;

said processor being configured to blend image data representative thereof into said three dimensional virtual environment to create a mixed reality environment, including a representation of said at least one physical obstruction, and display said mixed reality environment on said screen;

the processor including an input for receiving image data representative of images captured by an image capture device having its field of view covering a section of said external environment;

the processor being further configured to remove at least a portion of said at least one obstruction from said mixed reality environment displayed on said screen;

and blending said image data representative of a corresponding portion of said external environment beyond said obstruction into said mixed reality environment wherein said physical obstruction appears to be transparent or translucent relative to said external environment; and wherein said three dimensional virtual environment is identified in said processor as a first image layer;

said image data representative of said internal environment is identified in said processor as a second image layer; and said image data representative of said external environment, beyond said physical obstruction, is identified in said processor as a third image layer;

wherein, in respect of a selected portion of said physical obstruction, the processor is configured to:

remove from the mixed reality environment a corresponding portion of said second image layer including image data representative of said physical obstruction; and blend image data from a corresponding portion, relative to the user's field of view, of said third image layer into said mixed reality environment.

2. The system according to claim 1, configured to allow a user, in use, to select said at least a portion of said physical obstruction to be removed from said mixed reality environment.

3. The system according to claim 2, configured to allow a user, in use, to select said at least a portion of said physical obstruction to be removed from said mixed reality environment by means of one or more hand gestures.

4. The system according to claim 3, wherein said one or more hand gestures comprise predefined hand gestures associated with specific control commands.

5. The system according to claim 4, wherein said processor is configured to identify a user hand gesture and its location within the images of said internal environment, determine therefrom the control command with which it is associated, and generate said control command.

6. The system according to claim 3, further comprising a physical control panel including one or more physical control devices which are manually actuatable by the user, wherein said processor is configured to identify, within said captured images, user hand gestures indicative of actuation of said one or more physical control devices and generate a respective control signal for removing a selected portion of said physical obstruction from said mixed reality environment.

7. The system according to claim 1, comprising a pair of spatially separated image capture devices for capturing respective images of the real world environment in the user's field of view, said processor being configured to define a depth map using respective image frame pairs to produce three dimensional image data.

8. The system according to claim 7, wherein said image capture devices are mounted on said headset.

9. The system according to claim 8, wherein said image capture devices are mounted on said headset so as to be substantially aligned with a user's eyes, in use.

10. The apparatus according to claim 1, wherein the processor is configured to generate information symbols or messages in relation to said external environment, and selectively superimpose image data representative thereof onto said third image layer.

11. A method for selectively displaying an operational area to a user, said operational area comprising:

an internal environment and an external environment;

wherein said external environment is separated from said internal environment by at least one physical obstruction, the method comprising:

providing a system for selectively displaying said operational area, in a real world environment, to said user, said operational area comprising:

a headset for placing over said user's eyes, in use, the headset including a screen, the system further comprising:

a processor configured to generate a three-dimensional virtual environment; and an image capture device for capturing images of the real world environment within said internal environment;

said processor being configured to blend image data representative thereof into said three dimensional virtual environment to create a mixed reality environment, including a representation of said at least one physical obstruction, and display said mixed reality environment on said screen;

the processor including an input for receiving image data representative of images captured by an image capture device having its field of view covering a section of said external environment;

the processor being further configured to remove at least a portion of said at least one obstruction from said mixed reality environment displayed on said screen;

and receiving, from the image capture device, said images of the real world environment within said internal environment, blending said image data representative thereof into said three dimensional virtual environment to create said mixed reality environment, including said representation of said at least one physical obstruction; and displaying said mixed reality environment on said screen;

receiving an input representative of a selected portion of said physical obstruction;

removing said selected portion of said at least one obstruction from said mixed reality environment displayed on said screen;

and blending said image data representative of a corresponding portion of said external environment beyond said obstruction into said mixed reality environment wherein said physical obstruction appears to be transparent or translucent relative to said external environment.

12. The method according to claim 11, wherein said internal environment comprises an aircraft cockpit, and said physical obstruction comprises one or more of a control panel, an aircraft side wall and an aircraft floor, the method including the step of providing at least one image capture device in or on the external wall of the aircraft for capturing images representative of said external environment.

* * * * *